United States Patent

Sakaguchi et al.

[11] Patent Number: 5,140,296
[45] Date of Patent: Aug. 18, 1992

[54] VOLTAGE-DEPENDENT NONLINEAR RESISTOR

[75] Inventors: Toyoshige Sakaguchi; Kazuo Mukae; Koichi Tsuda, all of Kanagawa, Japan

[73] Assignee: Fuji Electronic Corporation, Ltd., Kanagawa, Japan

[21] Appl. No.: 648,132

[22] Filed: Jan. 30, 1991

[30] Foreign Application Priority Data

Jan. 31, 1990 [JP] Japan .................................. 2-21468
Mar. 20, 1990 [JP] Japan .................................. 2-71212
Jun. 7, 1990 [JP] Japan .................................. 2-149103

[51] Int. Cl.$^5$ .............................................. H01C 7/10
[52] U.S. Cl. .................................. 338/21; 252/518
[58] Field of Search .................. 338/20, 21; 252/518, 252/519, 520

[56] References Cited

FOREIGN PATENT DOCUMENTS 62-14924 4/1987 Japan .
1-25205 5/1989 Japan .

*Primary Examiner*—Marvin M. Lateef
*Attorney, Agent, or Firm*—Finnegan, Henderson, Farabow, Garrett and Dunner

[57] ABSTRACT

A voltage-dependent nonlinear resistor from a sintered composition of zinc oxide (ZnO) as a chief component and the following auxiliary components: a rare earth element; cobalt (Co); at least one of magnesium (Mg) and calcium (Ca); at least one of potassium (K), cesium (Cs) and rubidium (Rb); chromium (Cr); boron (B); at least one of aluminum (Al), gallium (Ga) and indium (In); and at least one of antimony (Sb), niobium (Nb), tungsten (W), tantalum (Ta) and phosphorus (P). A voltage-dependent nonlinear resistor from a sintered composition of zinc oxide (ZnO) as a chief component and the following auxiliary components: praseodymium (Pr); cobalt (Co); potassium (K); chromium (Cr); and at least one of antimony (Sb), niobium (Nb) and tungsten (W).

6 Claims, No Drawings

VOLTAGE-DEPENDENT NONLINEAR RESISTOR

BACKGROUND OF THE INVENTION

1. Field of the Invention

This invention relates to a voltage-dependent nonlinear resistor, more particularly to a voltage-dependent nonlinear resistor that is based on zinc oxide (ZnO) that is suitable for use as a device for protection from overvoltage.

2. Discussion of the Related Art

Varistors and arresters based on silicon carbide (SiC), selenium (Se), silicon (Si) or zinc oxide (ZnO) are conventionally used to protect electronic and electric devices from overvoltage. Among them, those varistors and arresters which are based on ZnO have advantages such as low residual voltage and a high voltage-dependent nonlinearity index. Thus, they are suitable for protecting those apparatus from overvoltage, such as semiconductor devices, that have a small overvoltage withstand capability. Under these circumstances, ZnO based varistors and arresters have increasingly supplanted SiC based versions. They are also used extensively as arresters for the purpose of protecting electric power apparatus.

Examined Japanese Patent Publication No. 25205/1989 describes a voltage-dependent nonlinear resistor that is produced by sintering a composition that contains ZnO as a chief component and the following as auxiliary components: 0.08–5.0 atomic percent(atm%) of a rare earth element; 0.1–10.0 atm% of cobalt (Co); 0.01–5.0 atm% at least one of magnesium (Mg) and calcium (Ca); 0.01–1.0 atm% of at least one of potassium (K), cesium (Cs) and rubidium (Rb); 0.01–1.0 atm% of chromium (Cr); $5 \times 10^{-4}$ to $1 \times 10^{-1}$ atm% of boron (B); and $1 \times 10^{-4}$ to $5 \times 10^{-2}$ atm% of at least one of aluminum (Al), gallium (Ga) and indium (In). The resulting resistor has a high voltage-dependent nonlinearity, a great surge withstand capability and a good life characteristics under voltage application.

Examined Japanese Patent Publication No. 14924/1987 describes a voltage-dependent nonlinear resistor that is produced by sintering a composition that contains ZnO as a chief component and the following as auxiliary components: 0.1–5.0 atm% of praseodymium (Pr); 0.5–5.0 atm% of cobalt (Co); 0.06–0.6 atm% in total of at least two of potassium (K), cesium (Cs) and rubidium (Rb); and 0.05–0.5 atm% of chromium (Cr). This resistor has a good voltage-dependent nonlinearity.

However, the two voltage-dependent nonlinear resistors described above still have the following problems. The performance of voltage-dependent nonlinear resistors is evaluated by two characteristics, the voltage per unit thickness with a current flowing at 1 mA [which is hereunder expressed as $V_{1 mA}/t$ (V/mm)] and the surge energy absorbing capability per unit volume [which is hereunder referred to as "permissible energy" (kJ/cm$^3$)]. Since the permissible energy decreases with increasing $V_{1 mA}/t$, the value of $V_{1 mA}/t$ is conventionally controlled not to exceed about 200 V/mm by adjusting the sintering conditions or other factors to suppress the growth of crystal grains. However, in certain applications such as where ZnO based resistors are used in surge arresters, not only the dimensions such as height but also the production cost have to be reduced. To meet this need, it is desired to increase the value of $V_{1 mA}/t$ to at least 300 V/mm.

SUMMARY OF THE INVENTION

The present invention has been made in view of the above circumstances and has an object of providing a voltage-dependent nonlinear resistor that has $V_{1 mA}/t$ of at least 300 V/mm and which yet, exhibits a permissible energy that is at least comparable to the value heretofore achievable at 200 V/mm.

The object of the present invention can be attained by a voltage-dependent nonlinear resistor that is a sintering of a composition which contains as basic components ZnO as a chief component, and the following as auxiliary components: 0.08–5.0 atm% of a rare earth element; 0.1–10.0 atm% of Co; 0.01–5.0 atm% of at least one of Mg and Ca; 0.01–1.0 atm% of at least one of K, Cs and Rb; 0.01–1.0 atm% of Cr; $5 \times 10^{-4}$ to $1 \times 10^{-1}$ atm% of B; $1 \times 10^{-4}$ to $5 \times 10^{-2}$ atm% of at least one of Al, Ga and In; and an additional component comprising $1 \times 10^{-3}$ to $5 \times 10^{-2}$ atm% of at least one of antimony (Sb), niobium (Nb), tungsten (W), tantalum (Ta) and phosphorus (P).

The object of the present invention can also be attained by a voltage-dependent nonlinear resistor that is a sintering of a composition which contains ZnO as a chief component and the following as auxiliary components: 0.1–5.0 atm% of Pr; 0.5–5.0 atm% of Co; 0.05–0.5 atm% of K; 0.05–0.5 atm% of Cr; and $1 \times 10^{-3}$ to $5 \times 10^{-2}$ atm% of at least one of antimony (Sb), niobium (Nb) and tungsten (W).

As briefly summarized above, the voltage-dependent nonlinear resistor, according to one aspect of the present invention, differs from the resistor described in the Examined Japanese Patent Publication No. 25205/1989 in that it additionally contains at least one of Sb, Nb, W, Ta and P in the composition to be sintered. Further, the voltage-dependent nonlinear resistor according to the other aspect of the present invention differs from the resistor described in the Examined Japanese Patent Publication No. 14924/1987 in that it additionally contains at least one of Sb, Nb and W in the composition to be sintered. In either aspect, the addition of one or more of the auxiliary components listed above is effective in sufficiently suppressing the grain growth during sintering to form a sintered product composed of small grains which increase the number of grain boundary layers present per unit thickness, thereby producing a voltage-dependent nonlinear resistor having high values of $V_{1 mA}/t$. Further, the addition of Sb, Nb, W, Ta or P is by no means detrimental to the structural homogeneity of the sintered product and it rather contributes to providing, in the higher $V_{1 mA}/t$ region, large permissible energy values that are at least comparable to those achievable by the voltage-dependent nonlinear resistors described in the Examined Japanese Patent Publication Nos. 25205/1989 and 14924/1987.

DETAILED DESCRIPTION OF THE INVENTION

The present invention is described below on the basis of the preferred embodiments.

The voltage-dependent nonlinear resistor of the present invention is produced by sintering a mixture of ZnO and addition components in either metallic or compound form in an oxygen-containing atmosphere at elevated temperatures. The addition components are generally added in metal oxide form but, if desired, compounds that are capable of converting to an oxide form during the sintering process, such as carbonates, hydroxides and fluorides, or solutions thereof, may be used. Alternatively, the addition components may be used in elemental form so that they convert to an oxide form during the sintering process.

In order to produce the voltage-dependent nonlinear resistor of the present invention, a ZnO powder is intimately mixed with powders of addition components either in a metallic or compound form; the mixture is calcined in air at 500° to 1,000° C. for several hours; the calcined product is finely pulverized and compressed into a predetermined shape followed by sintering in air at a temperature of about 1,100° to 1,400° C. for a period of several hours. If below 1,100° C., the compact will be sintered insufficiently to produce a sintered product having only stable characteristics. If above 1,400° C., it will be difficult to produce a homogeneously sintered product and the product obtained will not be suitable for practical applications since it will have a poor voltage-dependent nonlinearity and difficulty will be encountered with controlling its characteristics in a consistent manner.

Two specific examples of the voltage-dependent nonlinear resistor of the present invention are described below.

EXAMPLE 1

To a ZnO powder, $Pr_6O_{11}$, $Co_3O_4$, MgO, $K_2CO_3$, $Cr_2O_3$, $B_2O_3$ and $Al_2O_3$ powders, as well as at least one of $Sb_2O_3$, $Nb_2O_5$, $WO_3$, $Ta_2O_5$ and $P_2O_5$ powders were added in the amounts corresponding to the predetermined atomic percents specified in Tables 1 through 6 below and, after the individual powders were intimately mixed, calcination was conducted at 500° to 1,000° C. for several hours. Subsequently, the calcined products were finely pulverized, mixed with a binder and compressed into disks having a diameter of 17 mm. The disks were then sintered in air at 1,100° to 1,400° C. for 1 hour to produce the sintered products. The thus produced sintered products were ground and polished to make 2 mm thick samples and electrodes were printed onto opposite sides of each sample to prepare as test devices for their electrical characteristic measurements.

The electrical characteristics measured were the following: $V_1$ mA, or the voltage that developed between electrodes when a current of 1 mA was applied to the device; and permissible energy that was determined from the value of 2 ms rectangular current that could be applied 20 times without causing any puncture or surface breakdown in the sample and from the resulting residual voltage.

The composition of the voltage-dependent nonlinear resistor was variously altered and the results of measurements on the individual samples are shown in Tables 1 through 6. Table 1 shows the case where Sb was added to the basic composition; Table 2 shows the case where Nb was added; Table 3 shows the case where W was added; Table 4 shows the case where Ta was added; Table 5 shows the case where P was added; and Table 6 shows the case where both Nb and W were added. The formulations in each table are expressed by atomic percent which is calculated from the ratio of the number of atoms of a given metallic element to the total number of atoms of the elements in the starting materials used. In each table, $V_{1\ mA}/t$, which is the value of $V_{1\ mA}$ per unit thickness, is indicated by $V_{1\ mA}$ per se, and the "permissible energy ratio" is indicated in place of permissible energy. The "permissible energy ratio" is referenced to the value of permissible energy for the case where the $V_{1\ mA}/t$ of each of the voltage-dependent nonlinear resistors described in the Examined Japanese Patent Publication Nos. 25205/1989 and 14924/1987 is approximately 200 V/mm.

Sample Nos. 1 and 2 in each of Tables 1 through 6 correspond to a voltage-dependent nonlinear resistor that was produced by adding Pr, Co, Mg, K, Cr, B and Al to ZnO and they are listed for the purpose of comparison. Sample Nos. 1 and 2 had the same composition but were sintered under different conditions. Stated more specifically, sample No. 2 was sintered at a lower temperature than sample No. 1 and it produced a $V_{1\ mA}/t$ value greater than 300 V/mm. However, in terms of permissible energy ratio, the permissible energy of sample No. 2 decreased significantly as to be inoperable in practical applications when $V_{1\ mA}/t$ was set at a value greater than 300 V/mm.

TABLE 1

| Sample No. | Auxiliary Components (atm %) | | | | | | | | $V_{1\ mA}t$ (V/mm) | Permissible Energy Ratio |
|---|---|---|---|---|---|---|---|---|---|---|
| | Pr | Co | Mg | K | Cr | B | Al | Sb | | |
| 1 | 0.10 | 5.0 | 0.1 | 0.1 | 0.1 | 0.01 | 0.005 | 0 | 201 | 1 |
| 2 | 0.10 | 5.0 | 0.1 | 0.1 | 0.1 | 0.01 | 0.005 | 0 | 320 | 0.4 |
| 3 | 0.10 | 5.0 | 0.1 | 0.1 | 0.1 | 0.01 | 0.005 | 0.01 | 335 | 0.7 |
| 4 | 0.08 | 5.0 | 0.1 | 0.1 | 0.1 | 0.01 | 0.005 | 0.01 | 354 | 1.0 |
| 5 | 0.1 | 5.0 | 0.1 | 0.1 | 0.1 | 0.01 | 0.005 | 0.01 | 383 | 1.2 |
| 6 | 1.0 | 5.0 | 0.1 | 0.1 | 0.1 | 0.01 | 0.005 | 0.01 | 401 | 1.1 |
| 7 | 5.0 | 5.0 | 0.1 | 0.1 | 0.1 | 0.01 | 0.005 | 0.01 | 462 | 1.1 |
| 8 | 7.0 | 5.0 | 0.1 | 0.1 | 0.1 | 0.01 | 0.005 | 0.01 | 466 | 0.9 |
| 9 | 0.10 | 0.05 | 0.1 | 0.1 | 0.1 | 0.01 | 0.005 | 0.01 | 283 | 0.7 |
| 10 | 0.10 | 0.1 | 0.1 | 0.1 | 0.1 | 0.01 | 0.005 | 0.01 | 301 | 1.0 |
| 11 | 0.10 | 0.5 | 0.1 | 0.1 | 0.1 | 0.01 | 0.005 | 0.01 | 324 | 1.0 |
| 12 | 0.10 | 1.0 | 0.1 | 0.1 | 0.1 | 0.01 | 0.005 | 0.01 | 349 | 1.1 |
| 13 | 0.10 | 10.0 | 0.1 | 0.1 | 0.1 | 0.01 | 0.005 | 0.01 | 444 | 1.0 |
| 14 | 0.10 | 15.0 | 0.1 | 0.1 | 0.1 | 0.01 | 0.005 | 0.01 | 484 | 0.7 |
| 15 | 0.10 | 5.0 | 0.005 | 0.1 | 0.1 | 0.01 | 0.005 | 0.01 | 327 | 0.8 |
| 16 | 0.10 | 5.0 | 0.01 | 0.1 | 0.1 | 0.01 | 0.005 | 0.01 | 346 | 1.0 |
| 17 | 0.10 | 5.0 | 1.0 | 0.1 | 0.1 | 0.01 | 0.005 | 0.01 | 432 | 1.0 |
| 18 | 0.10 | 5.0 | 5.0 | 0.1 | 0.1 | 0.01 | 0.005 | 0.01 | 453 | 1.0 |
| 19 | 0.10 | 5.0 | 7.0 | 0.1 | 0.1 | 0.01 | 0.005 | 0.01 | 459 | 0.8 |
| 20 | 0.10 | 5.0 | 0.1 | 0.005 | 0.1 | 0.01 | 0.005 | 0.01 | 353 | 0.7 |
| 21 | 0.10 | 5.0 | 0.1 | 0.01 | 0.1 | 0.01 | 0.005 | 0.01 | 352 | 1.0 |
| 22 | 0.10 | 5.0 | 0.1 | 0.5 | 0.1 | 0.01 | 0.005 | 0.01 | 408 | 1.0 |
| 23 | 0.10 | 5.0 | 0.1 | 1.0 | 0.1 | 0.01 | 0.005 | 0.01 | 457 | 1.0 |
| 24 | 0.10 | 5.0 | 0.1 | 2.0 | 0.1 | 0.01 | 0.005 | 0.01 | 512 | 0.8 |
| 25 | 0.1 | 5.0 | 0.1 | 0.1 | 0.005 | 0.01 | 0.005 | 0.01 | 356 | 0.8 |

TABLE 1-continued

| Sample No. | Auxiliary Components (atm %) | | | | | | | | $V_{1\,mA}$ (V/mm) | Permissible Energy Ratio |
|---|---|---|---|---|---|---|---|---|---|---|
| | Pr | Co | Mg | K | Cr | B | Al | Sb | | |
| 26 | 0.1 | 5.0 | 0.1 | 0.1 | 0.01 | 0.01 | 0.005 | 0.01 | 366 | 1.1 |
| 27 | 0.1 | 5.0 | 0.1 | 0.1 | 0.5 | 0.01 | 0.005 | 0.01 | 409 | 1.0 |
| 28 | 0.1 | 5.0 | 0.1 | 0.1 | 1.0 | 0.01 | 0.005 | 0.01 | 429 | 1.0 |
| 29 | 0.1 | 5.0 | 0.1 | 0.1 | 2.0 | 0.01 | 0.005 | 0.01 | 473 | 0.7 |
| 30 | 0.1 | 5.0 | 0.1 | 0.1 | 0.1 | 0.0001 | 0.005 | 0.01 | 568 | 0.6 |
| 31 | 0.1 | 5.0 | 0.1 | 0.1 | 0.1 | 0.0005 | 0.005 | 0.01 | 544 | 1.0 |
| 32 | 0.1 | 5.0 | 0.1 | 0.1 | 0.1 | 0.005 | 0.005 | 0.01 | 399 | 1.1 |
| 33 | 0.1 | 5.0 | 0.1 | 0.1 | 0.1 | 0.05 | 0.005 | 0.01 | 322 | 1.1 |
| 34 | 0.1 | 5.0 | 0.1 | 0.1 | 0.1 | 0.1 | 0.005 | 0.01 | 301 | 1.0 |
| 35 | 0.1 | 5.0 | 0.1 | 0.1 | 0.1 | 0.5 | 0.005 | 0.01 | 248 | 0.8 |
| 36 | 0.1 | 5.0 | 0.1 | 0.1 | 0.1 | 0.01 | 0.00005 | 0.01 | 417 | 0.9 |
| 37 | 0.1 | 5.0 | 0.1 | 0.1 | 0.1 | 0.01 | 0.0001 | 0.01 | 425 | 1.0 |
| 38 | 0.1 | 5.0 | 0.1 | 0.1 | 0.1 | 0.01 | 0.001 | 0.01 | 414 | 1.1 |
| 39 | 0.1 | 5.0 | 0.1 | 0.1 | 0.1 | 0.01 | 0.01 | 0.01 | 367 | 1.0 |
| 40 | 0.1 | 5.0 | 0.1 | 0.1 | 0.1 | 0.01 | 0.05 | 0.01 | 301 | 1.0 |
| 41 | 0.1 | 5.0 | 0.1 | 0.1 | 0.1 | 0.01 | 0.1 | 0.01 | 189 | 0.8 |
| 42 | 0.1 | 5.0 | 0.1 | 0.1 | 0.1 | 0.01 | 0.005 | 0.0005 | 303 | 0.8 |
| 43 | 0.1 | 5.0 | 0.1 | 0.1 | 0.1 | 0.01 | 0.005 | 0.001 | 331 | 1.0 |
| 44 | 0.1 | 5.0 | 0.1 | 0.1 | 0.1 | 0.01 | 0.005 | 0.005 | 357 | 1.1 |
| 45 | 0.1 | 5.0 | 0.1 | 0.1 | 0.1 | 0.01 | 0.005 | 0.05 | 396 | 1.1 |
| 46 | 0.1 | 5.0 | 0.1 | 0.1 | 0.1 | 0.01 | 0.005 | 0.1 | 422 | 0.7 |

TABLE 3

| Sample No. | Auxiliary Components (atm %) | | | | | | | | $V_{1\,mA}$ (V/mm) | Permissible Energy Ratio |
|---|---|---|---|---|---|---|---|---|---|---|
| | Pr | Co | Mg | K | Cr | B | Al | W | | |
| 1 | 0.10 | 5.0 | 0.1 | 0.1 | 0.1 | 0.01 | 0.005 | 0 | 201 | 1 |
| 2 | 0.10 | 5.0 | 0.1 | 0.1 | 0.1 | 0.01 | 0.005 | 0 | 320 | 0.4 |
| 3 | 0.10 | 5.0 | 0.1 | 0.1 | 0.1 | 0.01 | 0.005 | 0.01 | 352 | 0.7 |
| 4 | 0.08 | 5.0 | 0.1 | 0.1 | 0.1 | 0.01 | 0.005 | 0.01 | 376 | 1.0 |
| 5 | 0.1 | 5.0 | 0.1 | 0.1 | 0.1 | 0.01 | 0.005 | 0.01 | 385 | 1.2 |
| 6 | 1.0 | 5.0 | 0.1 | 0.1 | 0.1 | 0.01 | 0.005 | 0.01 | 417 | 1.1 |
| 7 | 5.0 | 5.0 | 0.1 | 0.1 | 0.1 | 0.01 | 0.005 | 0.01 | 466 | 1.1 |
| 8 | 7.0 | 5.0 | 0.1 | 0.1 | 0.1 | 0.01 | 0.005 | 0.01 | 471 | 0.9 |
| 9 | 0.10 | 0.05 | 0.1 | 0.1 | 0.1 | 0.01 | 0.005 | 0.01 | 298 | 0.7 |
| 10 | 0.10 | 0.1 | 0.1 | 0.1 | 0.1 | 0.01 | 0.005 | 0.01 | 328 | 1.0 |
| 11 | 0.10 | 0.5 | 0.1 | 0.1 | 0.1 | 0.01 | 0.005 | 0.01 | 350 | 1.0 |
| 12 | 0.10 | 1.0 | 0.1 | 0.1 | 0.1 | 0.01 | 0.005 | 0.01 | 376 | 1.1 |
| 13 | 0.10 | 10.0 | 0.1 | 0.1 | 0.1 | 0.01 | 0.005 | 0.01 | 462 | 1.1 |
| 14 | 0.10 | 15.0 | 0.1 | 0.1 | 0.1 | 0.01 | 0.005 | 0.01 | 497 | 0.8 |
| 15 | 0.10 | 5.0 | 0.005 | 0.1 | 0.1 | 0.01 | 0.005 | 0.01 | 349 | 0.8 |
| 16 | 0.10 | 5.0 | 0.01 | 0.1 | 0.1 | 0.01 | 0.005 | 0.01 | 377 | 1.0 |
| 17 | 0.10 | 5.0 | 1.0 | 0.1 | 0.1 | 0.01 | 0.005 | 0.01 | 465 | 1.1 |
| 18 | 0.10 | 5.0 | 5.0 | 0.1 | 0.1 | 0.01 | 0.005 | 0.01 | 473 | 1.1 |
| 19 | 0.10 | 5.0 | 7.0 | 0.1 | 0.1 | 0.01 | 0.005 | 0.01 | 478 | 0.8 |
| 20 | 0.10 | 5.0 | 0.1 | 0.005 | 0.1 | 0.01 | 0.005 | 0.01 | 371 | 0.7 |
| 21 | 0.10 | 5.0 | 0.1 | 0.01 | 0.1 | 0.01 | 0.005 | 0.01 | 373 | 1.0 |
| 22 | 0.10 | 5.0 | 0.1 | 0.5 | 0.1 | 0.01 | 0.005 | 0.01 | 436 | 1.0 |
| 23 | 0.10 | 5.0 | 0.1 | 1.0 | 0.1 | 0.01 | 0.005 | 0.01 | 464 | 1.0 |
| 24 | 0.10 | 5.0 | 0.1 | 2.0 | 0.1 | 0.01 | 0.005 | 0.01 | 533 | 0.8 |
| 25 | 0.1 | 5.0 | 0.1 | 0.1 | 0.005 | 0.01 | 0.005 | 0.01 | 372 | 0.8 |
| 26 | 0.1 | 5.0 | 0.1 | 0.1 | 0.01 | 0.01 | 0.005 | 0.01 | 384 | 1.1 |
| 27 | 0.1 | 5.0 | 0.1 | 0.1 | 0.5 | 0.01 | 0.005 | 0.01 | 426 | 1.1 |
| 28 | 0.1 | 5.0 | 0.1 | 0.1 | 1.0 | 0.01 | 0.005 | 0.01 | 440 | 1.1 |
| 29 | 0.1 | 5.0 | 0.1 | 0.1 | 2.0 | 0.01 | 0.005 | 0.01 | 481 | 0.8 |
| 30 | 0.1 | 5.0 | 0.1 | 0.1 | 0.1 | 0.0001 | 0.005 | 0.01 | 569 | 0.7 |
| 31 | 0.1 | 5.0 | 0.1 | 0.1 | 0.1 | 0.0005 | 0.005 | 0.01 | 547 | 1.0 |
| 32 | 0.1 | 5.0 | 0.1 | 0.1 | 0.1 | 0.005 | 0.005 | 0.01 | 441 | 1.1 |
| 33 | 0.1 | 5.0 | 0.1 | 0.1 | 0.1 | 0.05 | 0.005 | 0.01 | 355 | 1.1 |
| 34 | 0.1 | 5.0 | 0.1 | 0.1 | 0.1 | 0.1 | 0.005 | 0.01 | 319 | 1.0 |
| 35 | 0.1 | 5.0 | 0.1 | 0.1 | 0.1 | 0.5 | 0.005 | 0.01 | 288 | 0.8 |
| 36 | 0.1 | 5.0 | 0.1 | 0.1 | 0.1 | 0.01 | 0.00005 | 0.01 | 433 | 0.9 |
| 37 | 0.1 | 5.0 | 0.1 | 0.1 | 0.1 | 0.01 | 0.0001 | 0.01 | 441 | 1.0 |
| 38 | 0.1 | 5.0 | 0.1 | 0.1 | 0.1 | 0.01 | 0.001 | 0.01 | 430 | 1.1 |
| 39 | 0.1 | 5.0 | 0.1 | 0.1 | 0.1 | 0.01 | 0.01 | 0.01 | 382 | 1.1 |
| 40 | 0.1 | 5.0 | 0.1 | 0.1 | 0.1 | 0.01 | 0.05 | 0.01 | 346 | 1.0 |
| 41 | 0.1 | 5.0 | 0.1 | 0.1 | 0.1 | 0.01 | 0.1 | 0.01 | 244 | 0.8 |
| 42 | 0.1 | 5.0 | 0.1 | 0.1 | 0.1 | 0.01 | 0.005 | 0.0005 | 325 | 0.8 |
| 43 | 0.1 | 5.0 | 0.1 | 0.1 | 0.1 | 0.01 | 0.005 | 0.001 | 354 | 1.0 |
| 44 | 0.1 | 5.0 | 0.1 | 0.1 | 0.1 | 0.01 | 0.005 | 0.005 | 371 | 1.1 |
| 45 | 0.1 | 5.0 | 0.1 | 0.1 | 0.1 | 0.01 | 0.005 | 0.05 | 427 | 1.1 |
| 46 | 0.1 | 5.0 | 0.1 | 0.1 | 0.1 | 0.01 | 0.005 | 0.1 | 456 | 0.8 |

TABLE 4

| Sample No. | Auxiliary Components (atm %) | | | | | | | | $V_{1 mA}$ (V/mm) | Permissible Energy Ratio |
|---|---|---|---|---|---|---|---|---|---|---|
| | Pr | Co | Mg | K | Cr | B | Al | Ta | | |
| 1 | 0.10 | 5.0 | 0.1 | 0.1 | 0.1 | 0.01 | 0.005 | 0 | 201 | 1 |
| 2 | 0.10 | 5.0 | 0.1 | 0.1 | 0.1 | 0.01 | 0.005 | 0 | 320 | 0.4 |
| 3 | 0.10 | 5.0 | 0.1 | 0.1 | 0.1 | 0.01 | 0.005 | 0.01 | 325 | 0.7 |
| 4 | 0.08 | 5.0 | 0.1 | 0.1 | 0.1 | 0.01 | 0.005 | 0.01 | 339 | 1.0 |
| 5 | 0.1 | 5.0 | 0.1 | 0.1 | 0.1 | 0.01 | 0.005 | 0.01 | 367 | 1.1 |
| 6 | 1.0 | 5.0 | 0.1 | 0.1 | 0.1 | 0.01 | 0.005 | 0.01 | 372 | 1.1 |
| 7 | 5.0 | 5.0 | 0.1 | 0.1 | 0.1 | 0.01 | 0.005 | 0.01 | 418 | 1.0 |
| 8 | 7.0 | 5.0 | 0.1 | 0.1 | 0.1 | 0.01 | 0.005 | 0.01 | 425 | 0.8 |
| 9 | 0.10 | 0.05 | 0.1 | 0.1 | 0.1 | 0.01 | 0.005 | 0.01 | 280 | 0.7 |
| 10 | 0.10 | 0.1 | 0.1 | 0.1 | 0.1 | 0.01 | 0.005 | 0.01 | 301 | 1.0 |
| 11 | 0.10 | 0.5 | 0.1 | 0.1 | 0.1 | 0.01 | 0.005 | 0.01 | 320 | 1.0 |
| 12 | 0.10 | 1.0 | 0.1 | 0.1 | 0.1 | 0.01 | 0.005 | 0.01 | 339 | 1.1 |
| 13 | 0.10 | 10.0 | 0.1 | 0.1 | 0.1 | 0.01 | 0.005 | 0.01 | 421 | 1.0 |
| 14 | 0.10 | 15.0 | 0.1 | 0.1 | 0.1 | 0.01 | 0.005 | 0.01 | 444 | 0.6 |
| 15 | 0.10 | 5.0 | 0.005 | 0.1 | 0.1 | 0.01 | 0.005 | 0.01 | 309 | 0.7 |
| 16 | 0.10 | 5.0 | 0.01 | 0.1 | 0.1 | 0.01 | 0.005 | 0.01 | 337 | 1.0 |
| 17 | 0.10 | 5.0 | 1.0 | 0.1 | 0.1 | 0.01 | 0.005 | 0.01 | 389 | 1.0 |
| 18 | 0.10 | 5.0 | 5.0 | 0.1 | 0.1 | 0.01 | 0.005 | 0.01 | 421 | 1.0 |
| 19 | 0.10 | 5.0 | 7.0 | 0.1 | 0.1 | 0.01 | 0.005 | 0.01 | 426 | 0.8 |
| 20 | 0.10 | 5.0 | 0.1 | 0.005 | 0.1 | 0.01 | 0.005 | 0.01 | 319 | 0.7 |
| 21 | 0.10 | 5.0 | 0.1 | 0.01 | 0.1 | 0.01 | 0.005 | 0.01 | 318 | 1.0 |
| 22 | 0.10 | 5.0 | 0.1 | 0.5 | 0.1 | 0.01 | 0.005 | 0.01 | 372 | 1.0 |
| 23 | 0.10 | 5.0 | 0.1 | 1.0 | 0.1 | 0.01 | 0.005 | 0.01 | 408 | 1.0 |
| 24 | 0.10 | 5.0 | 0.1 | 2.0 | 0.1 | 0.01 | 0.005 | 0.01 | 436 | 0.7 |
| 25 | 0.1 | 5.0 | 0.1 | 0.1 | 0.005 | 0.01 | 0.005 | 0.01 | 320 | 0.8 |
| 26 | 0.1 | 5.0 | 0.1 | 0.1 | 0.01 | 0.01 | 0.005 | 0.01 | 330 | 1.0 |
| 27 | 0.1 | 5.0 | 0.1 | 0.1 | 0.5 | 0.01 | 0.005 | 0.01 | 369 | 1.0 |
| 28 | 0.1 | 5.0 | 0.1 | 0.1 | 1.0 | 0.01 | 0.005 | 0.01 | 381 | 1.0 |
| 29 | 0.1 | 5.0 | 0.1 | 0.1 | 2.0 | 0.01 | 0.005 | 0.01 | 427 | 0.7 |
| 30 | 0.1 | 5.0 | 0.1 | 0.1 | 0.1 | 0.0001 | 0.005 | 0.01 | 505 | 0.6 |
| 31 | 0.1 | 5.0 | 0.1 | 0.1 | 0.1 | 0.0005 | 0.005 | 0.01 | 466 | 1.0 |
| 32 | 0.1 | 5.0 | 0.1 | 0.1 | 0.1 | 0.005 | 0.005 | 0.01 | 379 | 1.1 |
| 33 | 0.1 | 5.0 | 0.1 | 0.1 | 0.1 | 0.05 | 0.005 | 0.01 | 322 | 1.0 |
| 34 | 0.1 | 5.0 | 0.1 | 0.1 | 0.1 | 0.1 | 0.005 | 0.01 | 301 | 1.0 |
| 35 | 0.1 | 5.0 | 0.1 | 0.1 | 0.1 | 0.5 | 0.005 | 0.01 | 258 | 0.8 |
| 36 | 0.1 | 5.0 | 0.1 | 0.1 | 0.1 | 0.01 | 0.00005 | 0.01 | 398 | 0.8 |
| 37 | 0.1 | 5.0 | 0.1 | 0.1 | 0.1 | 0.01 | 0.0001 | 0.01 | 399 | 1.0 |
| 38 | 0.1 | 5.0 | 0.1 | 0.1 | 0.1 | 0.01 | 0.001 | 0.01 | 394 | 1.1 |
| 39 | 0.1 | 5.0 | 0.1 | 0.1 | 0.1 | 0.01 | 0.01 | 0.01 | 358 | 1.0 |
| 40 | 0.1 | 5.0 | 0.1 | 0.1 | 0.1 | 0.01 | 0.05 | 0.01 | 302 | 1.0 |
| 41 | 0.1 | 5.0 | 0.1 | 0.1 | 0.1 | 0.01 | 0.1 | 0.01 | 188 | 0.8 |
| 42 | 0.1 | 5.0 | 0.1 | 0.1 | 0.1 | 0.01 | 0.005 | 0.0005 | 285 | 0.7 |
| 43 | 0.1 | 5.0 | 0.1 | 0.1 | 0.1 | 0.01 | 0.005 | 0.001 | 304 | 1.0 |
| 44 | 0.1 | 5.0 | 0.1 | 0.1 | 0.1 | 0.01 | 0.005 | 0.005 | 322 | 1.1 |
| 45 | 0.1 | 5.0 | 0.1 | 0.1 | 0.1 | 0.01 | 0.005 | 0.05 | 371 | 1.0 |
| 46 | 0.1 | 5.0 | 0.1 | 0.1 | 0.1 | 0.01 | 0.005 | 0.1 | 378 | 0.7 |

TABLE 5

| Sample No. | Auxiliary Components (atm %) | | | | | | | | $V_{1 mA}$ (V/mm) | Permissible Energy Ratio |
|---|---|---|---|---|---|---|---|---|---|---|
| | Pr | Co | Mg | K | Cr | B | Al | P | | |
| 1 | 0.10 | 5.0 | 0.1 | 0.1 | 0.1 | 0.01 | 0.005 | 0 | 201 | 1 |
| 2 | 0.10 | 5.0 | 0.1 | 0.1 | 0.1 | 0.01 | 0.005 | 0 | 320 | 0.4 |
| 3 | 0.10 | 5.0 | 0.1 | 0.1 | 0.1 | 0.01 | 0.005 | 0.01 | 323 | 0.7 |
| 4 | 0.08 | 5.0 | 0.1 | 0.1 | 0.1 | 0.01 | 0.005 | 0.01 | 338 | 1.0 |
| 5 | 0.1 | 5.0 | 0.1 | 0.1 | 0.1 | 0.01 | 0.005 | 0.01 | 365 | 1.1 |
| 6 | 1.0 | 5.0 | 0.1 | 0.1 | 0.1 | 0.01 | 0.005 | 0.01 | 370 | 1.1 |
| 7 | 5.0 | 5.0 | 0.1 | 0.1 | 0.1 | 0.01 | 0.005 | 0.01 | 416 | 1.0 |
| 8 | 7.0 | 5.0 | 0.1 | 0.1 | 0.1 | 0.01 | 0.005 | 0.01 | 422 | 0.7 |
| 9 | 0.10 | 0.05 | 0.1 | 0.1 | 0.1 | 0.01 | 0.005 | 0.01 | 278 | 0.7 |
| 10 | 0.10 | 0.1 | 0.1 | 0.1 | 0.1 | 0.01 | 0.005 | 0.01 | 300 | 1.0 |
| 11 | 0.10 | 0.5 | 0.1 | 0.1 | 0.1 | 0.01 | 0.005 | 0.01 | 317 | 1.0 |
| 12 | 0.10 | 1.0 | 0.1 | 0.1 | 0.1 | 0.01 | 0.005 | 0.01 | 336 | 1.0 |
| 13 | 0.10 | 10.0 | 0.1 | 0.1 | 0.1 | 0.01 | 0.005 | 0.01 | 420 | 1.0 |
| 14 | 0.10 | 15.0 | 0.1 | 0.1 | 0.1 | 0.01 | 0.005 | 0.01 | 443 | 0.6 |
| 15 | 0.10 | 5.0 | 0.005 | 0.1 | 0.1 | 0.01 | 0.005 | 0.01 | 306 | 0.7 |
| 16 | 0.10 | 5.0 | 0.01 | 0.1 | 0.1 | 0.01 | 0.005 | 0.01 | 336 | 1.0 |
| 17 | 0.10 | 5.0 | 1.0 | 0.1 | 0.1 | 0.01 | 0.005 | 0.01 | 382 | 1.0 |
| 18 | 0.10 | 5.0 | 5.0 | 0.1 | 0.1 | 0.01 | 0.005 | 0.01 | 420 | 1.0 |
| 19 | 0.10 | 5.0 | 7.0 | 0.1 | 0.1 | 0.01 | 0.005 | 0.01 | 423 | 0.8 |
| 20 | 0.10 | 5.0 | 0.1 | 0.005 | 0.1 | 0.01 | 0.005 | 0.01 | 316 | 0.7 |
| 21 | 0.10 | 5.0 | 0.1 | 0.01 | 0.1 | 0.01 | 0.005 | 0.01 | 317 | 1.0 |
| 22 | 0.10 | 5.0 | 0.1 | 0.5 | 0.1 | 0.01 | 0.005 | 0.01 | 370 | 1.0 |
| 23 | 0.10 | 5.0 | 0.1 | 1.0 | 0.1 | 0.01 | 0.005 | 0.01 | 404 | 1.0 |
| 24 | 0.10 | 5.0 | 0.1 | 2.0 | 0.1 | 0.01 | 0.005 | 0.01 | 435 | 0.7 |
| 25 | 0.1 | 5.0 | 0.1 | 0.1 | 0.005 | 0.01 | 0.005 | 0.01 | 317 | 0.8 |
| 26 | 0.1 | 5.0 | 0.1 | 0.1 | 0.01 | 0.01 | 0.005 | 0.01 | 325 | 1.0 |
| 27 | 0.1 | 5.0 | 0.1 | 0.1 | 0.5 | 0.01 | 0.005 | 0.01 | 367 | 1.0 |

TABLE 5-continued

| Sample No. | Auxiliary Components (atm %) | | | | | | | | $V_{1\,mA}t$ (V/mm) | Permissible Energy Ratio |
|---|---|---|---|---|---|---|---|---|---|---|
| | Pr | Co | Mg | K | Cr | B | Al | P | | |
| 28 | 0.1 | 5.0 | 0.1 | 0.1 | 1.0 | 0.01 | 0.005 | 0.01 | 378 | 1.0 |
| 29 | 0.1 | 5.0 | 0.1 | 0.1 | 2.0 | 0.01 | 0.005 | 0.01 | 425 | 0.7 |
| 30 | 0.1 | 5.0 | 0.1 | 0.1 | 0.1 | 0.0001 | 0.005 | 0.01 | 501 | 0.5 |
| 31 | 0.1 | 5.0 | 0.1 | 0.1 | 0.1 | 0.0005 | 0.005 | 0.01 | 464 | 1.0 |
| 32 | 0.1 | 5.0 | 0.1 | 0.1 | 0.1 | 0.005 | 0.005 | 0.01 | 378 | 1.1 |
| 33 | 0.1 | 5.0 | 0.1 | 0.1 | 0.1 | 0.05 | 0.005 | 0.01 | 320 | 1.0 |
| 34 | 0.1 | 5.0 | 0.1 | 0.1 | 0.1 | 0.1 | 0.005 | 0.01 | 300 | 1.0 |
| 35 | 0.1 | 5.0 | 0.1 | 0.1 | 0.1 | 0.5 | 0.005 | 0.01 | 252 | 0.8 |
| 36 | 0.1 | 5.0 | 0.1 | 0.1 | 0.1 | 0.01 | 0.00005 | 0.01 | 396 | 0.8 |
| 37 | 0.1 | 5.0 | 0.1 | 0.1 | 0.1 | 0.01 | 0.0001 | 0.01 | 396 | 1.0 |
| 38 | 0.1 | 5.0 | 0.1 | 0.1 | 0.1 | 0.01 | 0.001 | 0.01 | 395 | 1.1 |
| 39 | 0.1 | 5.0 | 0.1 | 0.1 | 0.1 | 0.01 | 0.01 | 0.01 | 357 | 1.0 |
| 40 | 0.1 | 5.0 | 0.1 | 0.1 | 0.1 | 0.01 | 0.05 | 0.01 | 301 | 1.0 |
| 41 | 0.1 | 5.0 | 0.1 | 0.1 | 0.1 | 0.01 | 0.1 | 0.01 | 187 | 0.8 |
| 42 | 0.1 | 5.0 | 0.1 | 0.1 | 0.1 | 0.01 | 0.005 | 0.0005 | 238 | 0.6 |
| 43 | 0.1 | 5.0 | 0.1 | 0.1 | 0.1 | 0.01 | 0.005 | 0.001 | 303 | 1.0 |
| 44 | 0.1 | 5.0 | 0.1 | 0.1 | 0.1 | 0.01 | 0.005 | 0.005 | 321 | 1.1 |
| 45 | 0.1 | 5.0 | 0.1 | 0.1 | 0.1 | 0.01 | 0.005 | 0.05 | 370 | 1.0 |
| 46 | 0.1 | 5.0 | 0.1 | 0.1 | 0.1 | 0.01 | 0.005 | 0.1 | 376 | 0.7 |

TABLE 6

| Sample No. | Auxiliary Components (atm %) | | | | | | | | | $V_{1\,mA}t$ (V/mm) | Permissible Energy Ratio |
|---|---|---|---|---|---|---|---|---|---|---|---|
| | Pr | Co | Mg | K | Cr | B | Al | Nb | W | | |
| 1 | 0.10 | 5.0 | 0.1 | 0.1 | 0.1 | 0.01 | 0.005 | 0 | 0 | 201 | 1 |
| 2 | 0.10 | 5.0 | 0.1 | 0.1 | 0.1 | 0.01 | 0.005 | 0 | 0 | 320 | 0.4 |
| 3 | 0.10 | 5.0 | 0.1 | 0.1 | 0.1 | 0.01 | 0.005 | 0.005 | 0.005 | 341 | 0.8 |
| 4 | 0.08 | 5.0 | 0.1 | 0.1 | 0.1 | 0.01 | 0.005 | 0.005 | 0.005 | 353 | 1.0 |
| 5 | 0.1 | 5.0 | 0.1 | 0.1 | 0.1 | 0.01 | 0.005 | 0.005 | 0.005 | 370 | 1.3 |
| 6 | 1.0 | 5.0 | 0.1 | 0.1 | 0.1 | 0.01 | 0.005 | 0.005 | 0.005 | 384 | 1.2 |
| 7 | 5.0 | 5.0 | 0.1 | 0.1 | 0.1 | 0.01 | 0.005 | 0.005 | 0.005 | 436 | 1.1 |
| 8 | 7.0 | 5.0 | 0.1 | 0.1 | 0.1 | 0.01 | 0.005 | 0.005 | 0.005 | 439 | 0.9 |
| 9 | 0.10 | 0.05 | 0.1 | 0.1 | 0.1 | 0.01 | 0.005 | 0.005 | 0.005 | 298 | 0.9 |
| 10 | 0.10 | 0.1 | 0.1 | 0.1 | 0.1 | 0.01 | 0.005 | 0.005 | 0.005 | 311 | 1.1 |
| 11 | 0.10 | 0.5 | 0.1 | 0.1 | 0.1 | 0.01 | 0.005 | 0.005 | 0.005 | 335 | 1.2 |
| 12 | 0.10 | 1.0 | 0.1 | 0.1 | 0.1 | 0.01 | 0.005 | 0.005 | 0.005 | 353 | 1.2 |
| 13 | 0.10 | 10.0 | 0.1 | 0.1 | 0.1 | 0.01 | 0.005 | 0.005 | 0.005 | 441 | 1.0 |
| 14 | 0.10 | 15.0 | 0.1 | 0.1 | 0.1 | 0.01 | 0.005 | 0.005 | 0.005 | 467 | 0.8 |
| 15 | 0.10 | 5.0 | 0.005 | 0.1 | 0.1 | 0.01 | 0.005 | 0.005 | 0.005 | 334 | 0.8 |
| 16 | 0.10 | 5.0 | 0.01 | 0.1 | 0.1 | 0.01 | 0.005 | 0.005 | 0.005 | 352 | 1.0 |
| 17 | 0.10 | 5.0 | 1.0 | 0.1 | 0.1 | 0.01 | 0.005 | 0.005 | 0.005 | 419 | 1.1 |
| 18 | 0.10 | 5.0 | 5.0 | 0.1 | 0.1 | 0.01 | 0.005 | 0.005 | 0.005 | 442 | 1.1 |
| 19 | 0.10 | 5.0 | 7.0 | 0.1 | 0.1 | 0.01 | 0.005 | 0.005 | 0.005 | 448 | 0.8 |
| 20 | 0.10 | 5.0 | 0.1 | 0.005 | 0.1 | 0.01 | 0.005 | 0.005 | 0.005 | 340 | 0.8 |
| 21 | 0.10 | 5.0 | 0.1 | 0.01 | 0.1 | 0.01 | 0.005 | 0.005 | 0.005 | 333 | 1.1 |
| 22 | 0.10 | 5.0 | 0.1 | 0.5 | 0.1 | 0.01 | 0.005 | 0.005 | 0.005 | 370 | 1.1 |
| 23 | 0.10 | 5.0 | 0.1 | 1.0 | 0.1 | 0.01 | 0.005 | 0.005 | 0.005 | 421 | 1.0 |
| 24 | 0.10 | 5.0 | 0.1 | 2.0 | 0.1 | 0.01 | 0.005 | 0.005 | 0.005 | 464 | 0.9 |
| 25 | 0.1 | 5.0 | 0.1 | 0.1 | 0.005 | 0.01 | 0.005 | 0.005 | 0.005 | 339 | 0.8 |
| 26 | 0.1 | 5.0 | 0.1 | 0.1 | 0.01 | 0.01 | 0.005 | 0.005 | 0.005 | 352 | 1.1 |
| 27 | 0.1 | 5.0 | 0.1 | 0.1 | 0.5 | 0.01 | 0.005 | 0.005 | 0.005 | 397 | 1.1 |
| 28 | 0.1 | 5.0 | 0.1 | 0.1 | 1.0 | 0.01 | 0.005 | 0.005 | 0.005 | 406 | 1.1 |
| 29 | 0.1 | 5.0 | 0.1 | 0.1 | 2.0 | 0.01 | 0.005 | 0.005 | 0.005 | 441 | 0.8 |
| 30 | 0.1 | 5.0 | 0.1 | 0.1 | 0.1 | 0.0001 | 0.005 | 0.005 | 0.005 | 522 | 0.7 |
| 31 | 0.1 | 5.0 | 0.1 | 0.1 | 0.1 | 0.0005 | 0.005 | 0.005 | 0.005 | 511 | 1.0 |
| 32 | 0.1 | 5.0 | 0.1 | 0.1 | 0.1 | 0.005 | 0.005 | 0.005 | 0.005 | 484 | 1.2 |
| 33 | 0.1 | 5.0 | 0.1 | 0.1 | 0.1 | 0.05 | 0.005 | 0.005 | 0.005 | 334 | 1.1 |
| 34 | 0.1 | 5.0 | 0.1 | 0.1 | 0.1 | 0.1 | 0.005 | 0.005 | 0.005 | 313 | 1.0 |
| 35 | 0.1 | 5.0 | 0.1 | 0.1 | 0.1 | 0.5 | 0.005 | 0.005 | 0.005 | 286 | 0.8 |
| 36 | 0.1 | 5.0 | 0.1 | 0.1 | 0.1 | 0.01 | 0.00005 | 0.005 | 0.005 | 410 | 0.9 |
| 37 | 0.1 | 5.0 | 0.1 | 0.1 | 0.1 | 0.01 | 0.0001 | 0.005 | 0.005 | 415 | 1.0 |
| 38 | 0.1 | 5.0 | 0.1 | 0.1 | 0.1 | 0.01 | 0.001 | 0.005 | 0.005 | 414 | 1.1 |
| 39 | 0.1 | 5.0 | 0.1 | 0.1 | 0.1 | 0.01 | 0.01 | 0.005 | 0.005 | 377 | 1.1 |
| 40 | 0.1 | 5.0 | 0.1 | 0.1 | 0.1 | 0.01 | 0.05 | 0.005 | 0.005 | 321 | 1.0 |
| 41 | 0.1 | 5.0 | 0.1 | 0.1 | 0.1 | 0.01 | 0.1 | 0.005 | 0.005 | 235 | 0.8 |
| 42 | 0.1 | 5.0 | 0.1 | 0.1 | 0.1 | 0.01 | 0.005 | 0.00025 | 0.00025 | 296 | 0.8 |
| 43 | 0.1 | 5.0 | 0.1 | 0.1 | 0.1 | 0.01 | 0.005 | 0.0005 | 0.0005 | 314 | 1.1 |
| 44 | 0.1 | 5.0 | 0.1 | 0.1 | 0.1 | 0.01 | 0.005 | 0.0025 | 0.0025 | 331 | 1.2 |
| 45 | 0.1 | 5.0 | 0.1 | 0.1 | 0.1 | 0.01 | 0.005 | 0.025 | 0.025 | 379 | 1.1 |
| 46 | 0.1 | 5.0 | 0.1 | 0.1 | 0.1 | 0.01 | 0.005 | 0.05 | 0.05 | 395 | 0.8 |

Tables 1 through 6 show that voltage-dependent nonlinear resistors that were capable of producing $V_{1\,mA}/t$ values of 300 V/mm and more and which yet, had permissible energies at least comparable to the case where $V_{1\,mA}/T$ was 200 V/mm, thereby attaining the object of the present invention were sample Nos. 4-7, 10-13, 16-18, 21-23, 26-28, 31-34, 37-40 and 43-45 in each table. Considering these data altogether, the amounts of auxiliary components that are appropriate for the voltage-dependent nonlinear resistor of the present invention are as follows: 0.08–5.0 atm% Pr; 0.1–10.0 atm% Co; 0.01–5.0 atm% Mg; 0.01–1.0 atm% K; 0.01–1.0 atm% Cr; $5 \times 10^{-4}$ to $1 \times 10^{-1}$ atm% B; $1 \times 10^{-4}$ to $5 \times 10^{-2}$ atm% Al; and $1 \times 10^{-3}$ to $5 \times 10^{-2}$ atm% in total of at least one of Sb, Nb, W, Ta and P.

Thus, the voltage-dependent nonlinear resistor of the present invention which is characterized by having at least one of Sb, Nb, W, Ta and P added in an appropriate amount to a basic composition containing ZnO as a chief component and appropriate amounts of Pr, Co, Mg, K, Cr, B and Al as auxiliary components is capable of providing an excellent ability to absorb surge energy in a high $V_{1\,mA}$/t region of 300 V/mm or greater. This effect is attained when ZnO is used together with appropriate amounts of Pr, Co, Mg, K, Cr, B, Al and at least one of Sb, Nb, W, Ta and P in combination. If these auxiliary components were added singularly, the resistors produced may have such poor voltage-dependent nonlinearity that their characteristics would be substantially ohmic and not at all suitable for use in practical applications.

In Example 1 described above, Pr is shown only as an example of rare earth elements that can be added as auxiliary components. Other rare earth elements can also be used. In addition to Mg, Ca may be added either separately or simultaneously; in addition to K, Cs and Rb may be added either separately or simultaneously with K; and in addition to Al, Ga and In may be added either separately or simultaneously with Al. Even in these altered compositional systems, the addition of Sb, Nb, W, Ta or P according to the present invention achieves the same effect as described previously and this was confirmed in additional experiments conducted by the present inventors.

EXAMPLE 2

To a ZnO powder, $Pr_6O_{11}$, $Co_3O_4$, $K_2CO_3$ and $Cr_2O_3$ powders, as well as at least one of $Sb_2O_3$, $Nb_2O_5$ and $WO_3$ powders were added in the amounts corresponding to the predetermined atomic percents specified in Tables 7 through 10 below and, after the individual powders were intimately mixed, calcination was conducted at 500° to 1,000° C. for several hours. Subsequently, the calcined powders were finely pulverized, mixed with a binder and compressed into disks having a diameter of 17 mm. The disks were then sintered in air at 1,100° to 1,400° C. for 1 hour to produce the sintered products. The thus produced sintered products were ground and polished to make 2 mm thick samples and electrodes were printed onto both sides of each sample to prepare as test devices for their electrical characteristic measurements.

The electrical characteristics measured were the following: $V_{1\,mA}$, or the voltage that developed between electrodes when a current of 1 mA was applied to the device; and permissible energy that was determined from the value of 2 ms rectangular current that could be applied 20 times without causing any puncture or surface breakdown in the sample and from the resulting residual voltage.

The composition of the voltage-dependent nonlinear resistor was variously altered and the results of measurements on the individual samples are shown in Tables 7 through 10. Table 7 shows the case where Sb was added to the basic composition; Table 8 shows the case where Nb was added; Table 9 shows the case where W was added; and Table 10 shows the case where both Nb and W were added. The formulations in each table are expressed by atomic percent which is calculated from the ratio of the number of atoms of a given element to the total number of atoms of the metallic elements in the starting materials used. In each table, $V_{1\,mA}$/t, which is the value of $V_{1\,mA}$ per unit thickness, is indicated by $V_{1\,mA}$ per se, and the "permissible energy ratio" is indicated in place of permissible energy. The "permissible energy ratio" is referenced to the value of permissible energy for the case where the $V_{1\,mA}$/T of each of the voltage-dependent nonlinear resistors described in the Examined Japanese Patent Publication Nos. 25205/1989 and 14924/1987 is approximately 200 V/mm.

Sample Nos. 1 and 2 in each of Tables 7 through 10 correspond to a voltage-dependent nonlinear resistor that was produced by adding only Pr, Co, K and Cr to ZnO and they are listed for the purpose of comparison. Sample Nos. 1 and 2 had the same composition but were sintered under different conditions. Stated more specifically, sample Nos. 2 was sintered at a lower temperature than sample No. 1 and it produced a $V_{1\,mA}$/t value greater than 300 V/mm. However, in terms of permissible energy ratio, the permissible energy of sample No. 2 decreased significantly as to be inoperable in practical applications when $V_{1\,mA}$/t was set at a value greater than 300 V/mm.

TABLE 7

| Sample No. | Auxiliary Components (atm %) | | | | | $V_{1\,mA}$t (V/mm) | Permissible Energy Ratio |
|---|---|---|---|---|---|---|---|
| | Pr | Co | K | Cr | Sb | | |
| 1 | 0.05 | 2 | 0.1 | 0.2 | 0 | 200 | 1 |
| 2 | 0.5 | 2 | 0.1 | 0.2 | 0 | 305 | 0.5 |
| 3 | 0.05 | 2 | 0.1 | 0.2 | 0.01 | 268 | 0.7 |
| 4 | 0.1 | 2 | 0.1 | 0.2 | 0.01 | 303 | 1.0 |
| 5 | 0.2 | 2 | 0.1 | 0.2 | 0.01 | 326 | 1.0 |
| 6 | 0.5 | 2 | 0.1 | 0.2 | 0.01 | 338 | 1.1 |
| 7 | 1 | 2 | 0.1 | 0.2 | 0.01 | 341 | 1.0 |
| 8 | 5 | 2 | 0.1 | 0.2 | 0.01 | 387 | 1.0 |
| 9 | 7 | 2 | 0.1 | 0.2 | 0.01 | 414 | 0.8 |
| 10 | 0.5 | 0.2 | 0.1 | 0.2 | 0.01 | 272 | 0.8 |
| 11 | 0.5 | 0.5 | 0.1 | 0.2 | 0.01 | 302 | 1.0 |
| 12 | 0.5 | 1 | 0.1 | 0.2 | 0.01 | 324 | 1.1 |
| 13 | 0.5 | 5 | 0.1 | 0.2 | 0.01 | 341 | 1.0 |
| 14 | 0.5 | 7 | 0.1 | 0.2 | 0.01 | 405 | 0.8 |
| 15 | 0.5 | 2 | 0.02 | 0.2 | 0.01 | 286 | 0.8 |
| 16 | 0.5 | 2 | 0.05 | 0.2 | 0.01 | 311 | 1.0 |
| 17 | 0.5 | 2 | 0.2 | 0.2 | 0.01 | 340 | 1.0 |
| 18 | 0.5 | 2 | 0.5 | 0.2 | 0.01 | 349 | 1.0 |
| 19 | 0.5 | 2 | 0.7 | 0.2 | 0.01 | 407 | 0.7 |
| 20 | 0.5 | 2 | 0.1 | 0.02 | 0.01 | 482 | 0.6 |
| 21 | 0.5 | 2 | 0.1 | 0.05 | 0.01 | 368 | 1.0 |
| 22 | 0.5 | 2 | 0.1 | 0.1 | 0.01 | 353 | 1.0 |
| 23 | 0.5 | 2 | 0.1 | 0.5 | 0.01 | 307 | 1.0 |
| 24 | 0.5 | 2 | 0.1 | 0.7 | 0.01 | 228 | 0.9 |
| 25 | 0.5 | 2 | 0.1 | 0.2 | 0.0005 | 282 | 0.6 |
| 26 | 0.5 | 2 | 0.1 | 0.2 | 0.001 | 313 | 1.0 |
| 27 | 0.5 | 2 | 0.1 | 0.2 | 0.005 | 329 | 1.0 |
| 28 | 0.5 | 2 | 0.1 | 0.2 | 0.05 | 371 | 1.0 |
| 29 | 0.5 | 2 | 0.1 | 0.2 | 0.1 | 386 | 0.8 |

TABLE 8

| Sample No. | Auxiliary Components (atm %) | | | | | $V_{1\,mA}$t (V/mm) | Permissible Energy Ratio |
|---|---|---|---|---|---|---|---|
| | Pr | Co | K | Cr | Nb | | |
| 1 | 0.5 | 2 | 0.1 | 0.2 | 0 | 200 | 1 |
| 2 | 0.5 | 2 | 0.1 | 0.2 | 0 | 305 | 0.5 |
| 3 | 0.05 | 2 | 0.1 | 0.2 | 0.01 | 265 | 0.8 |
| 4 | 0.1 | 2 | 0.1 | 0.2 | 0.01 | 301 | 1.1 |
| 5 | 0.2 | 2 | 0.1 | 0.2 | 0.01 | 320 | 1.1 |
| 6 | 0.5 | 2 | 0.1 | 0.2 | 0.01 | 336 | 1.3 |
| 7 | 1 | 2 | 0.1 | 0.2 | 0.01 | 339 | 1.2 |
| 8 | 5 | 2 | 0.1 | 0.2 | 0.01 | 383 | 1.1 |

TABLE 8-continued

| Sample No. | Auxiliary Components (atm %) | | | | | $V_{1\ mA}/t$ (V/mm) | Permissible Energy Ratio |
|---|---|---|---|---|---|---|---|
| | Pr | Co | K | Cr | Nb | | |
| 9 | 7 | 2 | 0.1 | 0.2 | 0.01 | 413 | 0.9 |
| 10 | 0.5 | 0.2 | 0.1 | 0.2 | 0.01 | 269 | 0.8 |
| 11 | 0.5 | 0.5 | 0.1 | 0.2 | 0.01 | 301 | 1.1 |
| 12 | 0.5 | 1 | 0.1 | 0.2 | 0.01 | 322 | 1.2 |
| 13 | 0.5 | 5 | 0.1 | 0.2 | 0.01 | 337 | 1.1 |
| 14 | 0.5 | 7 | 0.1 | 0.2 | 0.01 | 403 | 0.8 |
| 15 | 0.5 | 2 | 0.02 | 0.2 | 0.01 | 285 | 0.8 |
| 16 | 0.5 | 2 | 0.05 | 0.2 | 0.01 | 307 | 1.1 |
| 17 | 0.5 | 2 | 0.2 | 0.2 | 0.01 | 338 | 1.1 |
| 18 | 0.5 | 2 | 0.5 | 0.2 | 0.01 | 345 | 1.1 |
| 19 | 0.5 | 2 | 0.7 | 0.2 | 0.01 | 403 | 0.8 |
| 20 | 0.5 | 2 | 0.1 | 0.02 | 0.01 | 480 | 0.9 |
| 21 | 0.5 | 2 | 0.1 | 0.05 | 0.01 | 363 | 1.1 |
| 22 | 0.5 | 2 | 0.1 | 0.1 | 0.01 | 348 | 1.2 |
| 23 | 0.5 | 2 | 0.1 | 0.5 | 0.01 | 303 | 1.1 |
| 24 | 0.5 | 2 | 0.1 | 0.7 | 0.01 | 225 | 0.8 |
| 25 | 0.5 | 2 | 0.1 | 0.2 | 0.0005 | 281 | 0.7 |
| 26 | 0.5 | 2 | 0.1 | 0.2 | 0.001 | 310 | 1.1 |
| 27 | 0.5 | 2 | 0.1 | 0.2 | 0.005 | 324 | 1.2 |
| 28 | 0.5 | 2 | 0.1 | 0.2 | 0.05 | 370 | 1.1 |
| 29 | 0.5 | 2 | 0.1 | 0.2 | 0.1 | 380 | 0.8 |

TABLE 9

| Sample No. | Auxiliary Components (atm %) | | | | | $V_{1\ mA}/t$ (V/mm) | Permissible Energy Ratio |
|---|---|---|---|---|---|---|---|
| | Pr | Co | K | Cr | W | | |
| 1 | 0.05 | 2 | 0.1 | 0.2 | 0 | 200 | 1 |
| 2 | 0.5 | 2 | 0.1 | 0.2 | 0 | 305 | 0.5 |
| 3 | 0.05 | 2 | 0.1 | 0.2 | 0.01 | 283 | 0.8 |
| 4 | 0.1 | 2 | 0.1 | 0.2 | 0.01 | 311 | 1.1 |
| 5 | 0.2 | 2 | 0.1 | 0.2 | 0.01 | 333 | 1.2 |
| 6 | 0.5 | 2 | 0.1 | 0.2 | 0.01 | 344 | 1.2 |
| 7 | 1 | 2 | 0.1 | 0.2 | 0.01 | 347 | 1.1 |
| 8 | 5 | 2 | 0.1 | 0.2 | 0.01 | 398 | 1.0 |
| 9 | 7 | 2 | 0.1 | 0.2 | 0.01 | 420 | 0.8 |
| 10 | 0.5 | 0.2 | 0.1 | 0.2 | 0.01 | 276 | 0.7 |
| 11 | 0.5 | 0.5 | 0.1 | 0.2 | 0.01 | 309 | 1.0 |
| 12 | 0.5 | 1 | 0.1 | 0.2 | 0.01 | 332 | 1.1 |
| 13 | 0.5 | 5 | 0.1 | 0.2 | 0.01 | 348 | 1.1 |
| 14 | 0.5 | 7 | 0.1 | 0.2 | 0.01 | 420 | 0.8 |
| 15 | 0.5 | 2 | 0.02 | 0.2 | 0.01 | 298 | 0.8 |
| 16 | 0.5 | 2 | 0.05 | 0.2 | 0.01 | 315 | 1.1 |
| 17 | 0.5 | 2 | 0.2 | 0.2 | 0.01 | 346 | 1.1 |
| 18 | 0.5 | 2 | 0.5 | 0.2 | 0.01 | 356 | 1.0 |
| 19 | 0.5 | 2 | 0.7 | 0.2 | 0.01 | 418 | 0.7 |
| 20 | 0.5 | 2 | 0.1 | 0.02 | 0.01 | 497 | 0.8 |
| 21 | 0.5 | 2 | 0.1 | 0.05 | 0.01 | 376 | 1.1 |
| 22 | 0.5 | 2 | 0.1 | 0.1 | 0.01 | 362 | 1.1 |
| 23 | 0.5 | 2 | 0.1 | 0.5 | 0.01 | 318 | 1.1 |
| 24 | 0.5 | 2 | 0.1 | 0.7 | 0.01 | 245 | 0.8 |
| 25 | 0.5 | 2 | 0.1 | 0.2 | 0.0005 | 293 | 0.8 |
| 26 | 0.5 | 2 | 0.1 | 0.2 | 0.001 | 322 | 1.1 |
| 27 | 0.5 | 2 | 0.1 | 0.2 | 0.005 | 334 | 1.1 |
| 28 | 0.5 | 2 | 0.1 | 0.2 | 0.05 | 380 | 1.0 |
| 29 | 0.5 | 2 | 0.1 | 0.2 | 0.1 | 392 | 0.7 |

TABLE 10

| Sample No. | Auxiliary Components (atm %) | | | | | | $V_{1\ mA}/t$ (V/mm) | Permissible Energy Ratio |
|---|---|---|---|---|---|---|---|---|
| | Pr | Co | K | Cr | Nb | W | | |
| 1 | 0.5 | 2 | 0.1 | 0.2 | 0 | 0 | 200 | 1 |
| 2 | 0.5 | 2 | 0.1 | 0.2 | 0 | 0 | 305 | 0.5 |
| 3 | 0.05 | 2 | 0.1 | 0.2 | 0.005 | 0.005 | 272 | 0.8 |
| 4 | 0.1 | 2 | 0.1 | 0.2 | 0.005 | 0.005 | 301 | 1.1 |
| 5 | 0.2 | 2 | 0.1 | 0.2 | 0.005 | 0.005 | 322 | 1.2 |
| 6 | 0.5 | 2 | 0.1 | 0.2 | 0.005 | 0.005 | 339 | 1.3 |
| 7 | 1 | 2 | 0.1 | 0.2 | 0.005 | 0.005 | 340 | 1.2 |
| 8 | 5 | 2 | 0.1 | 0.2 | 0.005 | 0.005 | 384 | 1.0 |
| 9 | 7 | 2 | 0.1 | 0.2 | 0.005 | 0.005 | 415 | 0.8 |
| 10 | 0.5 | 0.2 | 0.1 | 0.2 | 0.005 | 0.005 | 273 | 0.8 |
| 11 | 0.5 | 0.5 | 0.1 | 0.2 | 0.005 | 0.005 | 303 | 1.1 |
| 12 | 0.5 | 1 | 0.1 | 0.2 | 0.005 | 0.005 | 323 | 1.1 |
| 13 | 0.5 | 5 | 0.1 | 0.2 | 0.005 | 0.005 | 341 | 1.1 |
| 14 | 0.5 | 7 | 0.1 | 0.2 | 0.005 | 0.005 | 408 | 0.9 |
| 15 | 0.5 | 2 | 0.02 | 0.2 | 0.005 | 0.005 | 289 | 0.7 |
| 16 | 0.5 | 2 | 0.05 | 0.2 | 0.005 | 0.005 | 310 | 1.1 |
| 17 | 0.5 | 2 | 0.2 | 0.2 | 0.005 | 0.005 | 342 | 1.2 |
| 18 | 0.5 | 2 | 0.5 | 0.2 | 0.005 | 0.005 | 354 | 1.1 |
| 19 | 0.5 | 2 | 0.7 | 0.2 | 0.005 | 0.005 | 407 | 0.8 |
| 20 | 0.5 | 2 | 0.1 | 0.02 | 0.005 | 0.005 | 487 | 0.8 |
| 21 | 0.5 | 2 | 0.1 | 0.05 | 0.005 | 0.005 | 365 | 1.1 |
| 22 | 0.5 | 2 | 0.1 | 0.1 | 0.005 | 0.005 | 352 | 1.2 |
| 23 | 0.5 | 2 | 0.1 | 0.5 | 0.005 | 0.005 | 305 | 1.1 |
| 24 | 0.5 | 2 | 0.1 | 0.7 | 0.005 | 0.005 | 229 | 0.8 |
| 25 | 0.5 | 2 | 0.1 | 0.2 | 0.00025 | 0.00025 | 286 | 0.8 |
| 26 | 0.5 | 2 | 0.1 | 0.2 | 0.0005 | 0.0005 | 314 | 1.1 |
| 27 | 0.5 | 2 | 0.1 | 0.2 | 0.0025 | 0.0025 | 330 | 1.2 |
| 28 | 0.5 | 2 | 0.1 | 0.2 | 0.025 | 0.025 | 373 | 1.1 |
| 29 | 0.5 | 2 | 0.1 | 0.2 | 0.05 | 0.05 | 388 | 0.7 |

Tables 7 through 10 show that voltage-dependent nonlinear resistors that were capable of producing $V_{1\ mA}/t$ values of 300 V/mm and greater and which yet, had permissible energies at least comparable to the case where $V_{1\ mA}/t$ was 200 V/mm, thereby attaining the object of the present invention were sample Nos. 4–8, 11–13, 16–18, 21–23 and 26–28 in each table. Considering these data altogether, the amounts of auxiliary components that are appropriate for the voltage-dependent nonlinear resistor of the present invention are as follows: 0.1–5.0 atm% Pr; 0.5–5.0 atm% Co; 0.05–0.5 atm% K; 0.05–0.5 atm% Cr; and $1 \times 10^{-3}$ to $5 \times 10^{-2}$ atm% in total of at least one of Sb, Nb and W.

Thus, the voltage-dependent nonlinear resistor of the present invention which is characterized by having at least one of Sb, Nb and W added in appropriate amounts to a basic composition containing ZnO as a chief component and appropriate amounts of Pr, Co, K and Cr as auxiliary components is capable of providing an excellent ability to absorb surge energy in a high $V_{1\ mA}t$ region of 300 V/mm or greater. This effect is attained when ZnO is used together with appropriate amounts of Pr, Co, K and Cr and at least one of Sb, Nb and W in combination. If these auxiliary components were added singularly, the resistors produced may have such poor voltage-dependent nonlinearity that their characteristics would be substantially ohmic and not at all suitable for use in practical applications.

As described on the foregoing pages, the voltage-dependent nonlinear resistor of the present invention produced by sintering a composition that is based on ZnO and which contains auxiliary components including rare earth elements, as well as at least one of Sb, Nb, W, Ta and P produces $V_{1\ mA}/t$ values of 300 V/mm and greater and yet, it has a surge energy absorbing capability that is at least comparable to the case where $V_{1\ mA}/t$ is approximately 200 V/mm. This feature of the present invention is very effective for the purpose of reducing the size and production cost of surge arrestors and other equipments where voltage-dependent nonlinear resistors are employed.

While the invention has been described in detail and with reference to specific embodiments thereof, it will be apparent to one skilled in the art that various changes and modifications can be made therein without departing from the spirit and scope thereof.

What is claimed is:

1. A voltage-dependent nonlinear resistor comprising a sintered composition containing a basic component, comprising zinc oxide as a principal component and the following auxiliary components: 0.08-5.0 atomic percent in total of at least one rare earth element; 0.1-10.0 atomic percent of cobalt; 0.01-5.0 atomic percent of at least one of magnesium and calcium; 0.01-1.0 atomic percent in total of at least one of potassium, cesium and rubidium; 0.01-1.0 atomic percent of chromium; $5\times10^{-4}$ to $1\times10^{-1}$ atomic percent of boron, and $1\times10^{-4}$ to $5\times10^{-2}$ atomic percent in total of at least one of aluminum, gallium and indium, and at least one additional component selected from the group consisting of antimony, niobium, tungsten, tantalum and phosphorus, in an amount of $1\times10^{-3}$ to $5\times10^{-2}$ atomic percent.

2. A voltage-dependent nonlinear resistor comprising a sintered compositioncontaining a basic component comprising zinc oxide as a principal component and the following auxiliary components: 0.1-5.0 atomic percent of praseodymium; 0.5-5.0 atomic percent of cobalt; 0.05-0.5 atomic percent of potassium; and 0.05-0.5 atomic percent of chromium, and at least one additional component selected from the group consisting of antimony, niobium and tungsten in an amount of $1\times10^{-3}$ to $5\times10^{-2}$ atomic percent.

3. A method for producing a voltage-dependent nonlinear resistor comprising the steps of:
mixing a sintered composition claimed in claim 1
calcining the mixture in air;
pulverizing the calcined product and compressing the product into a predetermined shape;
sintering the product in air;
grinding and polishing the sintered product and cutting it into predetermined dimensions; and
printing electrodes onto the opposite sides of the product.

4. A method for producing a voltage-dependent nonlinear resistor comprising the steps of:
mixing a sintered composition claimed in claim 2
calcining the mixture in air;
pulverizing the calcined product and compressing the product into a predetermined shape;
sintering the product in air;
grinding and polishing the sintered product and cutting it into predetermined dimensions; and
printing electrodes onto the opposite sides of the product.

5. A voltage-dependent nonlinear resistor having the following properties: 1) a voltage per unit thickness with a current flowing at 1 mA ($V_{1\ mA}/t$) of at least 300 V/mm and 2) a surge energy absorbing capability per unit volume (permissible energy) approximately equal to a voltage-dependent nonlinear resistor having $V_{1\ mA}/t$ of about 200 V/mm, wherein said voltage-dependent nonlinear resistor comprises a sintered composition containing a basic component, comprising zinc oxide as a principal component and the following auxiliary components: 0.08-5.0 atomic percent in total of at least one rare earth element; 0.1-10.0 atomic percent of cobalt; 0.01-5.0 atomic percent of at least one of magnesium and calcium; 0.01-1.0 atomic percent in total of at least one of potassium, cesium and rubidium; 0.01-1.0 atomic percent of chromium; $5\times10^{-4}$ to $1\times10^{-1}$ atomic percent of boron, and $1\times10^{-4}$ to $5\times10^{-2}$ atomic percent in total of at least one of aluminum, gallium and indium, and at least one additional component selected from the group consisting of antimony, niobium, tungsten, tantalum and phosphorus, in an amount of $1\times10^{-3}$ to $5\times10^{-2}$ atomic percent.

6. A voltage-dependent nonlinear resistor having the following properties: 1) a voltage per unit thickness with a current flowing at 1 mA ($V_{1\ mA}/t$) of at least 300 V/mm and 2) a surge energy absorbing capability per unit volume (permissible energy) approximately equal to a voltage-dependent nonlinear resistor having $V_{1\ mA}/t$ of about 200 V/mm, wherein said voltage-dependent nonlinear resistor comprises a sintered composition containing a basic component, comprising zinc oxide as a principal component and the following auxiliary components: 0.1-5.0 atomic percent of praseodymium; 0.5-5.0 atomic percent of cobalt; 0.05-0.5 atomic percent of potassium; and 0.05-0.5 atomic percent of chromium, and at least one additional component selected from the group consisting of antimony, niobium and tungsten in an amount of $1\times10^{-3}$ to $5\times10^{-2}$ atomic percent.

* * * * *

UNITED STATES PATENT AND TRADEMARK OFFICE
CERTIFICATE OF CORRECTION

PATENT NO. : 5,140,296

DATED : August 18, 1992

INVENTOR(S) : Toyoshige Sakaguchi et al.

It is certified that error appears in the above-identified patent and that said Letters Patent is hereby corrected as shown below:

Claim 2, column 15, line 48, change "compositioncontaining" to --composition containing--.

Signed and Sealed this

Twenty-first Day of December, 1993

Attest:

BRUCE LEHMAN

Attesting Officer    Commissioner of Patents and Trademarks